US012802046B2

(12) United States Patent
Shin

(10) Patent No.: US 12,802,046 B2
(45) Date of Patent: Nov. 17, 2026

(54) RECOMMENDATION SYSYEM AND METHOD FOR VEHICLE MAINTENANCE RESERVATIONS

(71) Applicants: HYUNDAI MOTOR COMPANY, Seoul (KR); Kia Corporation, Seoul (KR)

(72) Inventor: Hongju Shin, Hwaseong-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 94 days.

(21) Appl. No.: 18/930,590

(22) Filed: Oct. 29, 2024

(65) Prior Publication Data

US 2025/0156820 A1 May 15, 2025

(30) Foreign Application Priority Data

Nov. 14, 2023 (KR) ........................ 10-2023-0156993

(51) Int. Cl.
*G06Q 30/00* (2023.01)
*G06Q 10/20* (2023.01)
*G06Q 30/0601* (2023.01)

(52) U.S. Cl.
CPC ......... *G06Q 10/20* (2013.01); *G06Q 30/0631* (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 10,380,557 B2 * | 8/2019 | Merg | G07C 5/08 | |
| 11,556,902 B2 * | 1/2023 | Gulati | G06Q 10/20 | |
| 12,217,135 B1 * | 2/2025 | Kasturi | G06N 20/00 | |
| 2016/0063774 A1 * | 3/2016 | Afshar | A47L 13/11 | 701/29.1 |
| 2016/0171540 A1 * | 6/2016 | Mangipudi | G06Q 30/0255 | 705/14.53 |

(Continued)

OTHER PUBLICATIONS

Rylander, Lina, et al., "Design of Diagnosis Service System for Self-Driving Vehicles—Learnings from the Driver's Role Today", 2021 Global Reliability and Prognostics and Health Management, 978-1-6654-0131-9/21 (Year: 2021).*

*Primary Examiner* — Ethan D Civan
(74) *Attorney, Agent, or Firm* — Morgan, Lewis & Bockius LLP

(57) ABSTRACT

A recommendation system for a vehicle maintenance reservation includes a reservation sentence acquisition module configured to obtain a reservation current state sentence indicating a current state of a vehicle to be serviced from consultation data provided in a form of a human language; a repair order sentence acquisition module configured to obtain a repair order current state sentence indicating the current state of the vehicle being serviced from data written in a repair order; a first correct answer set generating module configured to generate a first correct answer set using the reservation current state sentence and the repair order current state sentence; and a maintenance work recommendation module configured to recommend a task for vehicle maintenance based on a user's language obtained through reservation consultation, using a first model trained with the first correct answer set.

20 Claims, 10 Drawing Sheets

(56) References Cited

U.S. PATENT DOCUMENTS

| | | | | |
|---|---|---|---|---|
| 2022/0058579 | A1 * | 2/2022 | Chong | G06Q 40/08 |
| 2022/0165104 | A1 * | 5/2022 | Gardiner | G06F 16/56 |
| 2023/0297460 | A1 * | 9/2023 | Tonari | G06F 11/0793<br>714/48 |

* cited by examiner

FIG. 2

| |
|---|
| 0 = Outside/Padding |
| 1 = Begin-current state |
| 2 = Inside-current state |
| 3 = Begin-cause |
| 4 = Inside-cause |
| 5 = Begin-action |
| 6 = Inside-action |

- original text : [C] Fuel gauge malfunction.Gauge warning light turns on/ way change occurs due to defective fuel sender/way change occurs.Fuel sender replacement.

| | | | | | | | | | | | | |
|---|---|---|---|---|---|---|---|---|---|---|---|---|
| 12 | 357 | 239 | 1027 | 78 | 36 | 188 | 7 | 49 | 22 | 568 | 29 | |
| BS | IS | IS | BC | IC | IC | IC | IC | IC | IC | BA | IA | |
| 1 | 2 | 2 | 3 | 4 | 4 | 4 | 4 | 4 | 4 | 5 | 6 | 0 ··· |

- current state : [C] Fuel gauge malfunction.
- cause : Gauge warning light turns on/ way change occurs due to defective fuel sender/way change occurs.
- action : Fuel sender replacement.

FIG. 6

(1) calculate frequency of all parts combinations

| parts combination | frequency |
|---|---|
| A/C | 10 |
| B/C | 10 |
| A/B/C | 10 |

(2) calculate probability of individual combination

| Support | combination |
|---|---|
| 1 | C |
| 0.666667 | B/C |
| 0.666667 | A |
| 0.666667 | B |
| 0.333333 | A/B/C |

(3-1) extract probability of 50% or more

| Support | combination |
|---|---|
| 1 | C |
| 0.666667 | BC |
| 0.333333 | A/B/C |

(3-2) extract higher combination number in case of same rate

| Support | combination |
|---|---|
| 0.666667 | C |
| 0.666667 | BC |
| 0.666667 | A/B/C |

RECOMMENDATION SYSYEM AND METHOD FOR VEHICLE MAINTENANCE RESERVATIONS

CROSS-REFERENCE TO RELATED APPLICATION

The present application claims priority to Korean Patent Application No 10-2023-0156993 filed on Nov. 14, 2023, the entire contents of which is incorporated herein for all purposes by this reference.

BACKGROUND OF THE PRESENT DISCLOSURE

Field of the Present Disclosure

The present disclosure relates to a recommendation system and method for vehicle maintenance reservation.

Description of Related Art

A vehicle repair shop is a facility that performs maintenance or repairs on vehicles and provides services ranging from basic maintenance, such as oil changes, brake pad replacements, and tire replacements to diagnosing and repairing electrical and electronic systems or repairing and replacing major parts, such as engines, transmissions, and exhaust systems. If a problem occurs with a vehicle, it may be difficult for non-expert drivers or owners to know what maintenance work is needed or which parts are needed to solve the problem, so the non-expert drivers or owners may determine a vehicle repair shop through consult with a counselor in many cases. During the consultation, the counselor may determine a current condition of the vehicle and recommend a vehicle repair shop based on knowledge of possible causes and actions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a recommendation system and method for a vehicle maintenance reservation configured for recognizing a current state of a vehicle problem from human language in a form of consultation contents or documents and recommending tasks and parts required for maintenance.

The present disclosure attempts to provide a recommendation system and method for a vehicle maintenance reservation configured for providing an estimate or recommending a vehicle repair shop based on recommended tasks and portions.

According to an exemplary embodiment of the present disclosure, a recommendation system for a vehicle maintenance reservation including: a reservation sentence acquisition module configured to obtain a reservation current state sentence indicating a current state of a vehicle to be serviced from consultation data provided in a form of a human language; a repair order sentence acquisition module configured to obtain a repair order current state sentence indicating the current state of the vehicle being serviced from data written in a repair order; a first correct answer set generating module configured to generate a first correct answer set using the reservation current state sentence and the repair order current state sentence; and a maintenance work recommendation module configured to recommend a task for vehicle maintenance based on a user's language obtained through reservation consultation, using a first model trained with the first correct answer set.

In some exemplary embodiments of the present disclosure, the first correct answer set generating module may be configured to generate a 1:N mapping for the reservation current state sentence and the repair order current state sentence, wherein the N is an integer of 1 or more, determine a similarity between the reservation current state sentence and the repair order current state sentence, and determine a vehicle model, a task name, and a task code for maintenance work, with respect to a mapping relationship between the reservation current state sentence and the repair order current state sentence whose similarity is more than or equal to a predetermined threshold to generate the first correct answer set.

In some exemplary embodiments of the present disclosure, the first correct answer set generating module may be configured to determine a similarity including a cosine similarity and a rank for the reservation current state sentence and the repair order current state sentence.

In some exemplary embodiments of the present disclosure, the first correct answer set generating module may be configured to generate the first correct answer set including both a correct answer set generated when the N is 1 and a correct answer set generated when the N is more than 2.

In some exemplary embodiments of the present disclosure, the first correct answer set generating module may be configured to generate the first correct answer set further including a correct answer set generated only from the repair order current state sentence.

In some exemplary embodiments of the present disclosure, the maintenance work recommendation module may recommend a plurality of tasks for the vehicle maintenance, and provide information on a usage rate for each of the recommended tasks.

In some exemplary embodiments of the present disclosure, the recommendation system may further include: a second correct answer set generating module configured to generate a second correct answer set by considering a parts usage rate for the recommended task; and a maintenance parts recommendation module configured to recommend a parts combination required for the recommended task using a second model trained with the second correct answer set.

In some exemplary embodiments of the present disclosure, the second correct answer set generating module may generates the second correct answer set including a correct answer set including a parts combination in which the parts usage rate satisfies a predetermined first condition and a correct answer set including a parts combination in which the parts usage rate does not satisfy the first condition but satisfies a predetermined second condition.

In some exemplary embodiments of the present disclosure, the second correct answer set generating module may be configured to generate the second correct answer set including a newly generated correct answer set according to probability of occurrence of a new parts combination.

In some exemplary embodiments of the present disclosure, the recommendation system may further include: an estimate providing module configured to provide an estimate for the recommended parts combination; and a repair shop recommendation module configured to recommend a repair shop based on the recommended task, the parts combination, and the estimate.

According to another exemplary embodiment of the present disclosure, a recommendation method for a vehicle maintenance reservation includes: obtaining a reservation current state sentence indicating a current state of a vehicle to be serviced from consultation data provided in a form of a human language; obtaining a repair order current state sentence indicating the current state of the vehicle being serviced from data written in a repair order; generating a first correct answer set using the reservation current state sentence and the repair order current state sentence; and recommending a task for vehicle maintenance based on a user's language obtained through reservation consultation, using a first model trained with the first correct answer set.

In some exemplary embodiments of the present disclosure, the generating of the first correct answers set may include: generating a 1:N mapping for the reservation current state sentence and the repair order current state sentence, wherein the N is an integer of 1 or more; determining a similarity between the reservation current state sentence and the repair order current state sentence; and determining a vehicle model, a task name, and a task code for maintenance work, with respect to a mapping relationship between the reservation current state sentence and the repair order current state sentence whose similarity is more than or equal to a predetermined threshold to generate the first correct answer set.

In some exemplary embodiments of the present disclosure, the generating of the first correct answer set may include: determining a similarity including a cosine similarity and a rank for the reservation current state sentence and the repair order current state sentence.

In some exemplary embodiments of the present disclosure, the generating of the first correct answer set may include: generating the first correct answer set including both a correct answer set generated when the N is 1 and a correct answer set generated when the N is more than 2.

In some exemplary embodiments of the present disclosure, the generating of the first correct answer set may include: generating the first correct answer set further including a correct answer set generated only from the repair order current state sentence.

In some exemplary embodiments of the present disclosure, the recommending of the task for vehicle maintenance may include: recommending a plurality of tasks for the vehicle maintenance; and providing information on a usage rate for each of the recommended tasks.

In some exemplary embodiments of the present disclosure, the recommendation method may further include: generating a second correct answer set by considering a parts usage rate for the recommended task; and recommending a parts combination required for the recommended task using a second model trained with the second correct answer set.

In some exemplary embodiments of the present disclosure, the generating of the second correct answer set may include: generating the second correct answer set including a correct answer set including a parts combination in which the parts usage rate satisfies a predetermined first condition and a correct answer set including a parts combination in which the parts usage rate does not satisfy the first condition but satisfies a predetermined second condition.

In some exemplary embodiments of the present disclosure, the generating of the second correct answer set may include: generating the second correct answer set further including a newly generated correct answer set according to probability of occurrence of a new parts combination.

In some exemplary embodiments of the present disclosure, the recommendation method may further include: providing an estimate for the recommended parts combination; and recommending a repair shop based on the recommended task, the parts combination, and the estimate.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2, FIG. 3 and FIG. 4 are diagrams illustrating an operation of a maintenance work recommendation module according to an exemplary embodiment of the present disclosure.

FIG. 5 and FIG. 6 are diagrams illustrating an operation of a maintenance parts recommendation module according to an exemplary embodiment of the present disclosure.

Figure 1:
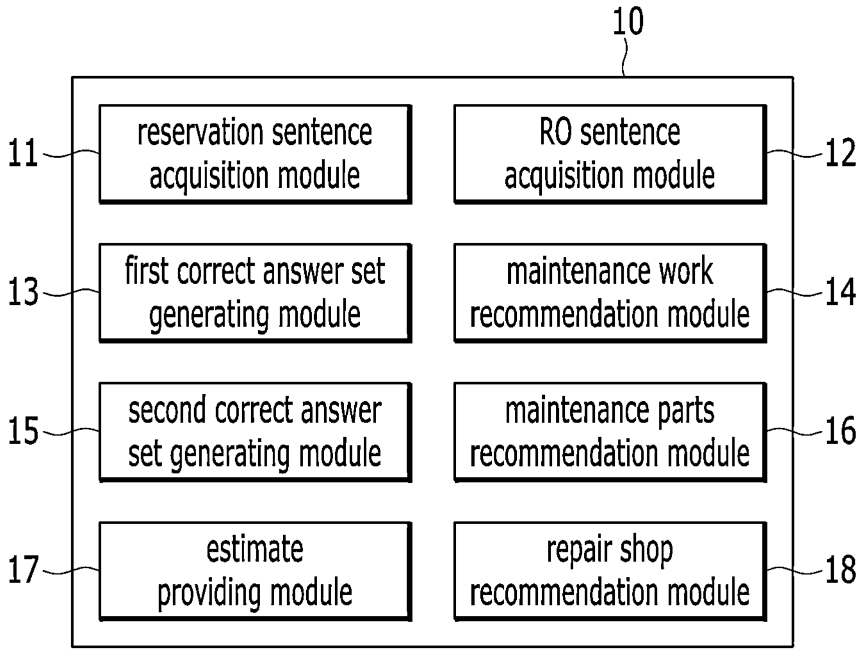
FIG. 1 is a block diagram illustrating a recommendation system for a vehicle maintenance reservation according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described more fully hereinafter with reference to the accompanying drawings, in which exemplary embodiments of the present disclosure are shown. As those skilled in the art would realize, the described embodiments may be modified in various different ways and are not limited to the exemplary embodiments described herein. Portions that are irrelevant to the description will be omitted to clearly describe the present disclosure, and same reference numerals designate same or like elements throughout the description.

Throughout the specification and claims, unless explicitly described to the contrary, the word "comprise", and variations, such as "comprises" or "comprising", will be understood to imply the inclusion of stated elements but not the exclusion of any other elements. It will be understood that, although the terms first, second, etc. may be used herein to describe various elements, these elements should not be limited by these terms. These terms are only used to distinguish one element from another.

The terms "part" "unit", "module" described in the specification refer to a unit configured for processing at least one function or operation described in the present specification and may be implemented by hardware or circuit, software, or a combination of a hardware or circuit and software.

Figure 3:
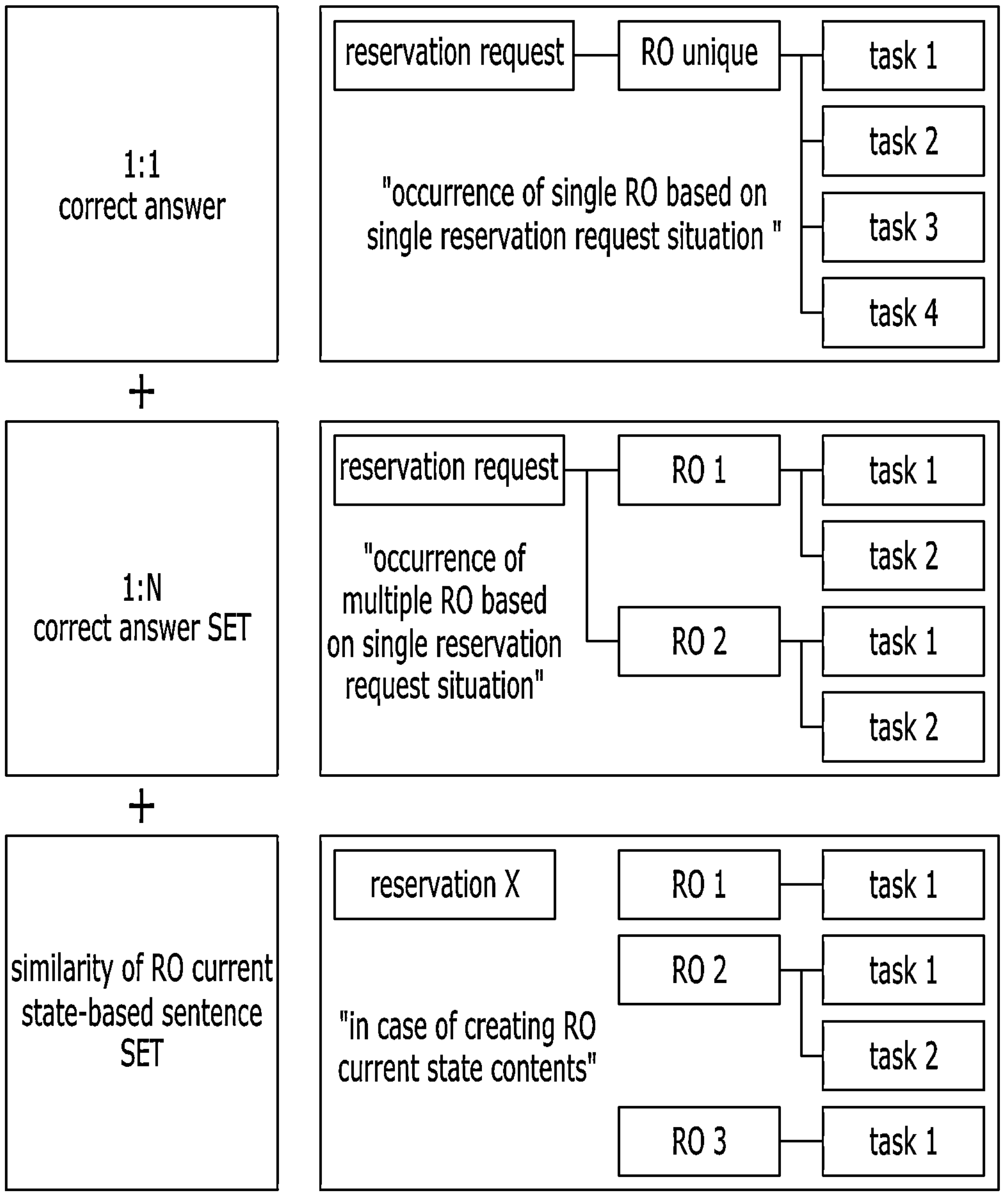
Figure 4:
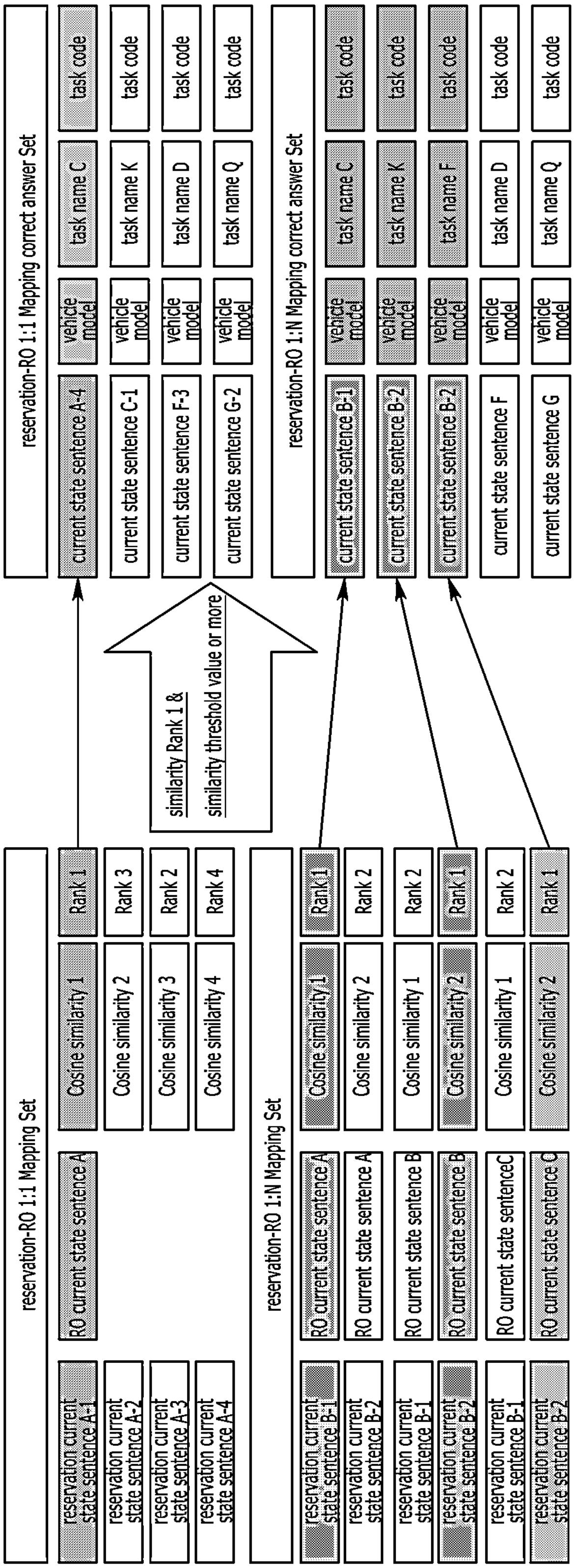

FIG. 1 is a block diagram illustrating a recommendation system for a vehicle maintenance reservation according to an exemplary embodiment of the present disclosure, and FIG. 2, FIG. 3 and FIG. 4 are diagrams illustrating an operation of a maintenance work recommendation module according to an exemplary embodiment of the present disclosure.

Referring to FIG. 1, a recommendation system 10 for a vehicle maintenance reservation according to various exemplary embodiments of the present disclosure may recognize a current state in which a vehicle problem has occurred from human language in a form of consultation contents or document, recommend a tasks or parts required for maintenance, and provide an estimate or recommend a repair shop based thereon. The recommendation system 10 for a vehicle maintenance reservation may include a reservation sentence acquisition module 11, a repair order (RO) sentence acquisition module 12, a first correct answer set generating module 13, a maintenance work recommendation module 14, a second correct answer set generating module 15, a maintenance parts recommendation module 16, an estimate providing module 17, and a repair shop recommendation module 18.

The reservation sentence acquisition module 11 may obtain a reservation current state sentence indicating a current state of a vehicle to be serviced from consultation data provided in a form of a human language. The reservation current state sentence may be collected from a user who makes a maintenance reservation, such as "power seat does not move back and forth properly," and may indicate a vehicle problem to be solved through a maintenance reservation.

The reservation sentence acquisition module 11 may obtain a reservation current state sentence from the consultation data of the user who makes a maintenance reservation. Here, the consultation data may be a text format of the contents the user said during the consultation. In various exemplary embodiments of the present disclosure, the reservation sentence acquisition module 11 may separate a sentence from the consultation data using a predetermined separator, and if a length of the sentence is excessively long, the reservation sentence acquisition module 11 may adjust the sentence to be less than a predetermined length. Furthermore, the reservation sentence acquisition module 11 may perform word embedding to convert text data into a numerical form. To the present end, in various exemplary embodiments of the present disclosure, the reservation sentence acquisition module 11 may use the word2vec model to convert words into vectors of a fixed size.

The RO sentence acquisition module 12 may obtain an RO current state sentence indicating the current state of the vehicle being serviced from data written in the RO. The RO current state sentence is collected from the contents written in the RO, such as "Received because driver's power seat does not move back and forth," and may indicate a vehicle problem to be solved through a maintenance reservation expressed by a mechanic.

The RO sentence acquisition module 12 may extract the RO current state sentence describing the current state in which a vehicle problem has occurred from the text data written in the RO. In addition to the contents regarding the current condition of the vehicle, the RO also includes other contents, including contents on a cause diagnosed by the mechanic and actions taken by the mechanic. In the case of parsing the text written in the RO using a rule-based method that uses predefined grammar rules, it may be difficult to parse the contents that does not conform to the determined rules to extract the contents regarding the current state and it may be difficult to response to various language variations and exceptional structures. Therefore, in the instant case, it was necessary to perform an additional parsing operation on the contents not parsed using the rule-based method. To improve the present problem, the RO sentence acquisition module 12 may be configured to predict and extract the RO current state sentence regarding the current state of the vehicle from the text written in the RO based on tagging and word embedding.

The RO sentence acquisition module 12 may perform tagging by distinguishing a current state, cause, and action regarding the text written in the RO, generate an embedding layer based on word embedding, generate a learning layer with a two-way long short-term memory (LSTM), and generate a hidden layer to perform modeling and learning.

For example, the RO sentence acquisition module 12 may sample data to learn a word model from the text written in the RO. In various exemplary embodiments of the present disclosure, in the sampling, 1/30 sampling may be adopted to extract about 200,000 pieces of data out of about 6 million pieces of data. The RO sentence acquisition module 12 may perform learning with a 128-dimensional matrix with a vector size per word and may inject the same into an embedding layer for a prediction model. Furthermore, in various exemplary embodiments of the present disclosure, tokenization may be performed on a morpheme-by-morpheme basis, each token may be indexed with an integer, or padding may be performed to equalize the sentence length.

Meanwhile, the RO sentence acquisition module 12 may separate the text written in the RO into morpheme units and perform integer indexing on each separated word unit. Referring to FIG. 2 together, an example of indexing integers 0 to 6 when the original text written in the RO is "[C] Fuel gauge malfunction. Gauge warning light is turned on due to defective fuel sender/way change occurs. Fuel sender replacement." is illustrated. The RO sentence acquisition module 12 may perform indexing by deforming BIO tagging with sequence labeling as "Beginning", "Inside", "Outside" and mapping integers 0, 1, 2, 3, 4, 5, and 6 to "Outside/Padding", "Begin-current state", "Inside-current state", "Begin-cause", "Inside-cause", "Begin-action", and "Inside-action", respectively. As a result, "[C] Fuel gauge malfunction." may be tagged with integers 1 and 2 indicating the current state, "Gauge warning light turns on/way change occurs due to defective fuel sender" may be tagged with integers 3 and 4 indicating the cause. "Replace fuel sender." may be tagged with the integers 5 and 6 to indicate an action. In the present manner, the RO sentence acquisition module 12 may tag the text written in the RO with integers 1 and 2 indicating the current state, integers 3 and 4 indicating the cause, and integers 5 and 6 indicating the action.

The RO sentence acquisition module 12 may train a prediction model based on the two-way LSTM model using the prediction model including the tagged values and obtain the RO current state sentence indicating the current state of the vehicle serviced using the prediction model with high accuracy without omission.

The first correct answer set generating module 13 may be configured to generate a first correct answer set using the reservation current state sentence obtained by the reservation sentence acquisition module 11 and the RO current state sentence obtained by the RO sentence acquisition module 12.

Referring to FIG. 3 and FIG. 4 together, the first correct answer set generating module 13 issues one RO based on one reservation requirement and may be configured to generate 1:1 mapping for the reservation current state sentence and the RO current state sentence. For example, when a reservation current state sentence A-1, a reservation current state sentence A-2, a reservation current state sentence A-3, and a reservation current state sentence A-4 are included in one reservation requirement, the first correct answer set generating module 13 may map the RO current state sentence A to one issued RO. Subsequently, the first correct answer set generating module 13 may be configured to determine a similarity between the mapped reservation current state sentence and the RO current state sentence. In various exemplary embodiments of the present disclosure, the first correct answer set generating module 13 may be configured to determine a similarity including a cosine similarity and a rank for the mapped reservation current state sentence and the RO current state sentence.

The cosine similarity may use a cosine angle to measure a similarity between word vectors. For example, the cosine similarity may include a value of −1 to 1. As the cosine similarity is closer to 1, a similarity of two word vectors may be higher, and as the cosine similarity is closer to −1, the two word vectors may not be similar. Here, the word vectors may represent the mapped reservation current state sentence and RO current state sentence respectively as word vectors. Meanwhile, the rank may indicate an order when the similarity between the mapped reservation current state sentence and the RO current state sentence is sorted in descending order. In FIG. 4, it is illustrated that, in the 1:1 mapping of the reservation current state sentence and the RO current state sentence, the similarity between the reservation current state sentence A-1 and the RO current state sentence A is the highest, and the similarity between the reservation current state sentence A-4 and the RO current state sentence A is the lowest.

The first correct answer set generating module 13 may be configured to generate the first correct answer set by determining a vehicle model, a task name, and a task code for maintenance work, with respect to the mapping relationship between the reservation current state sentence and the RO current state sentence whose similarity is more than or equal to a predetermined threshold. Alternatively, the first answer set generating module 13 may be configured to generate the first correct answer set by determining a vehicle model, a task name, and a task code for maintenance work, with respect to the mapping relationship between the reservation current state sentence and the RO current state sentence whose rank of the similarity is more than or equal to a predetermined threshold. In FIG. 4, it is illustrated that the vehicle model, the task name, and the task code are determined for the reservation current state sentence A-4 from the mapping relationship between the reservation current state sentence and the RO current state sentence whose rank of the similarity is 1 and similarity is more than or equal to a threshold value. Through the present method, the first correct answer set generating module 13 may be configured to generate the first correct answer set in which a task name C for the reservation current state sentence A-4 is determined, a task name K for the reservation current state sentence C-1 is determined, a task name D for the reservation current state sentence F-3 is determined, and a task name Q is determined for the reservation current state sentence G-2 is determined.

Meanwhile, the first correct answer set generating module 13 issues a plurality of ROs based on one reservation requirement, and generates 1:N (here, N is an integer of 2 or more) mapping for the reservation current state sentence and the RO current state sentence. For example, when reservation current state sentence B-1 and reservation current state sentence B-2 are included in one reservation requirement, the first correct answer set generating module 13 may map an RO current state sentence A written in a first RO, an RO current state sentence B written in a second RO, and an RO current state sentence C written in a third RO to each of the reservation current state sentence B-1 and the reservation current state sentence B-2. Subsequently, the first correct answer set generating module 13 may be configured to determine a similarity between the mapped reservation current state sentence and the RO current state sentence.

The first correct answer set generating module 13 may be configured to generate the first correct answer set by determining the vehicle model, the task name, and the task code, with respect to the mapping relationship between the reservation current state sentence and the RO current state sentence whose similarity is more than or equal to a predetermined threshold or whose rank of the similarity is more than or equal to a predetermined value. In FIG. 4, the first correct answer set in which the task name C is determined for a reservation current state sentence B-1, the task name K is determined for a reservation current state sentence B-2, the task name F is determined for a reservation current state sentence B-2, the task name D is determined for a reservation current state sentence F, and the task name Q is determined for a reservation current state sentence G, from the mapping relationship between the reservation current state sentence and the RO current state sentence whose rank of the similarity is 1 and whose similarity is equal to or greater than a certain threshold value.

In various exemplary embodiments of the present disclosure, the first correct answer set generating module 13 may be configured to generate a correct answer set including both a correct answer set generated through 1:1 mapping for the reservation current state sentence and the RO current state sentence and a correct answer set generated through 1:N (here, N is an integer of 2 or more) mapping for the reservation current state sentence and the RO current state sentence.

Meanwhile, the first correct answer set generating module 13 may be configured to generate the first correct answer set further including a correct answer set generated only from the RO current state sentence, as a case in which contents for the RO current state is generated without a reservation, in addition to the correct answer set generated through 1:1 mapping for the reservation current state sentence and the RO current state sentence and the correct answer set generated through 1:N (here, N is an integer of 2 or more) mapping for the reservation current state sentence and the RO current state sentence.

As shown in FIG. 3, because the first correct answer set generating module 13 generates a correct answer set by considering data for various conditions in a case in which hone RO is issued based on one reservation requirement, a case in which a plurality of ROs are issued based on one reservation requirement, and a case in which contents for the RO current state are generated without a reservation, quality of the correct answer set may increase, and the first model trained using the correct answer set may obtain the RO current state sentence indicating the current state of the vehicle being serviced with higher accuracy without an omission.

The maintenance work recommendation module 14 may recommend a task for vehicle maintenance from a language of the user who has obtained through reservation consultation using the first model trained with the first correct answer set generated by the first correct answer set generating module 13. Here, the first model may be implemented as a deep learning model and may be the prediction model described above.

In various exemplary embodiments of the present disclosure, the maintenance work recommendation module 14 may recommend a plurality of tasks for vehicle maintenance. Since there is not necessarily only one task to solve a certain current state, the maintenance work recommendation module 14 may recommend a plurality of tasks to solve the current state. For example, the maintenance work recommendation module 14 may recommend a first task, a second task, and a third task to solve the corresponding current state.

In various exemplary embodiments of the present disclosure, the maintenance work recommendation module 14 may provide information on a usage rate for each of the recommended tasks. For example, the maintenance work recommendation module 14 may provide information indicating that the first task to solve the current state includes a usage rate of 72.95%, the second task includes a usage rate of 14.26%, and the third task includes a usage rate of 3.1%, as well.

In the present manner, by recommending multiple tasks for vehicle maintenance and providing the information on usage rates for each recommended task, the user may consider different types of tasks and their usage rates when comparing estimates as described below together.

Figure 5:
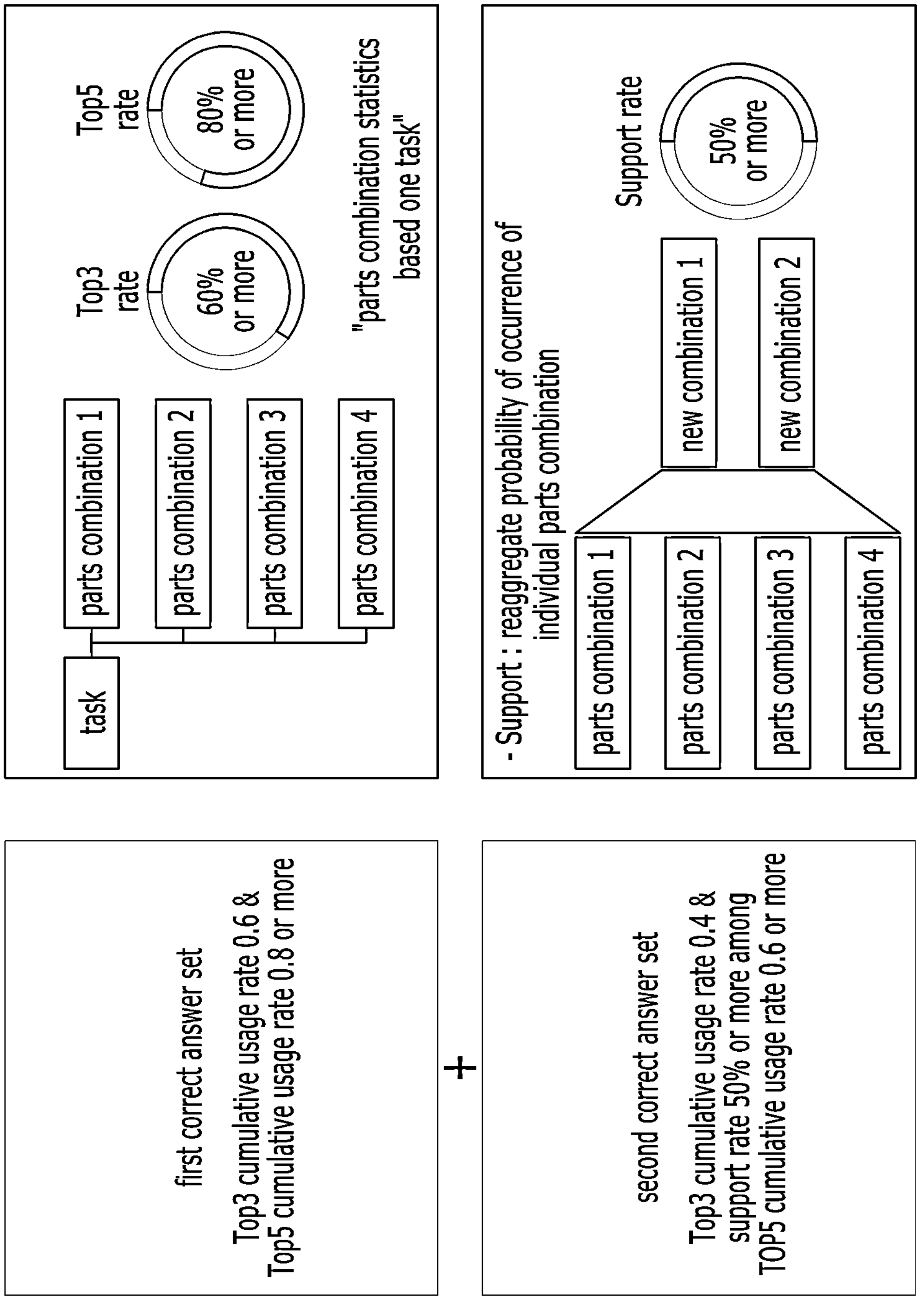

FIG. 5 and FIG. 6 are diagrams illustrating an operation of a maintenance parts recommendation module according to an exemplary embodiment of the present disclosure.

Referring to FIGS. 1 and 5 together, the second correct answer set generating module 15 may be configured to generate a second correct answer set by considering a parts usage rate for a task recommended by the maintenance work recommendation module 14.

The second correct answer set generating module 15 may generate, as a second correct answer set, a parts combination whose parts usage rate satisfies a predetermined first condition from the perspective of parts combination statistics based on a certain task. In various exemplary embodiments of the present disclosure, the first condition is that, for each parts combination based on a certain task, a cumulative usage rate (Top3 cumulative usage rate) of the parts combination including a parts usage rate belonging to top three ranks may be 0.6 or more and the cumulative usage rate (Top5 cumulative usage rate) of the parts combination belonging to top five ranks may be 0.8 or higher. by applying the first condition, the accuracy of the correct answer set may be improved.

Meanwhile, the second correct answer set generating module 15 may generate, as a second correct answer set, a parts combination whose parts usage rate does not satisfy the first condition but satisfies the predetermined second condition, in terms of parts combination statistics based on a certain task. In various exemplary embodiments of the present disclosure, the second condition may be that, for each parts combination based on a certain task, the cumulative usage rate (Top3 cumulative usage rate) of the parts combinations including a parts usage rate belonging to top three ranks is 0.4 or more and the cumulative usage rate (Top5 cumulative usage rate) of the parts combinations belonging to top five ranks is 0.6 or more. That is, the second condition may include a wider range than the first condition.

In various exemplary embodiments of the present disclosure, the second correct answer set generating module 15 may be configured to generate a second correct answer set including both a correct answer set generated based on a parts combination in which a parts usage rate satisfies a predetermined first condition and a correct answer set generated based on a parts combination in which the parts usage rate does not satisfy the predetermined first condition but satisfies a second condition.

Meanwhile, the second correct answer set generating module 15 may newly generate a correct answer set according to the probability of occurrence (support ratio) for a new parts combination from the perspective of re-aggregating the probability of occurrence of an individual parts combination. In various exemplary embodiments of the present disclosure, the second correct answer set generating module 15 may newly generate, as a correct answer set, a parts combination in which the probability of occurrence for the new parts combination is 50% or more.

Referring to FIG. 6 together, to determine the probability of occurrence of a new parts combination, the second correct answer set generating module 15 may be configured to determine the frequency of all parts combinations and determine the probability of individual combinations. For example, in the case of a parts combination of "A/C", the frequency may be 10, in the case of a parts combination of "B/C", the frequency may be 10, and in the case of a parts combination of "A/B/C", the frequency may be 10, from which the probability for the combination "C" may be calculated as 1, the probability for the combination "B/C" may be calculated as 0.666667, the probability for the combination "A" may be calculated as 0.666667, the probability for the combination "B" may be calculated as 0.666667, and the probability for the combination "A/B/C" may be calculated as 0.333333. Next, the second correct answer set generating module 15 may extract "C" and "B/C", which are a parts combination with a probability of occurrence of 50% or more for a new parts combination and include the same in the correct answer set. If a plurality of certain combinations are equal, the one with the larger number of combinations may be extracted first. For example, if the probabilities for "C", "B/C", and "A/B/C" are equal, "A/B/C" with the largest number of combinations may be selected as the correct answer set.

In various exemplary embodiments of the present disclosure, the second correct answer set generating module 15 may be configured to generate a second correct answer set further including a newly generated correct answer set according to the probability of occurrence for a new parts combination, in addition to the correct answer set generated based on the parts combination in which the parts usage rate satisfies the predetermined first condition and the correct answer set generated based on the parts combination in which the parts usage rate does not satisfy the predetermined first condition but satisfies the second condition. The second model trained using the present set of correct answers may not only recommend a parts combination with high accuracy, but may also expand the range or coverage of recommendations, providing multiple and rich services to users.

The maintenance parts recommendation module 16 may recommend a parts combination required for the recommended task using the second model trained with the second answer set generated by the second correct answer set generating module 15. Here, the second model may be implemented as a deep learning model.

The estimate providing module 17 may provide an estimate for the parts combination recommended by the maintenance parts recommendation module 16. If there are multiple tasks recommended for vehicle maintenance, the estimate providing module 17 may provide multiple estimates for each task. Furthermore, when there are multiple combinations of parts recommended for one task, the estimate providing module 17 may provide multiple estimates for each parts combination. In various exemplary embodiments of the present disclosure, the estimate providing module 17 may be configured to determine an average value of amounts incurred over a certain time period (e.g., 1 year) as a representative amount and provide an estimate based thereon.

The repair shop recommendation module 18 may recommend a repair shop to the user based on recommended tasks, the parts combination, and the estimate. In various exemplary embodiments of the present disclosure, the repair shop recommendation module 18 may select an appropriate repair shop from a maintenance network database and recommend the repair shop to the user by considering location information of the user, a repair rate of the repair shop, a reservation digestion rate of the repair shop, a reservation failure rate of the repair shop, whether the repair shop has equipment for a corresponding task, the inventory of parts expected to be needed, a reservation status of the repair shop, visit history of the user, etc. according to an expected task.

Figure 7:
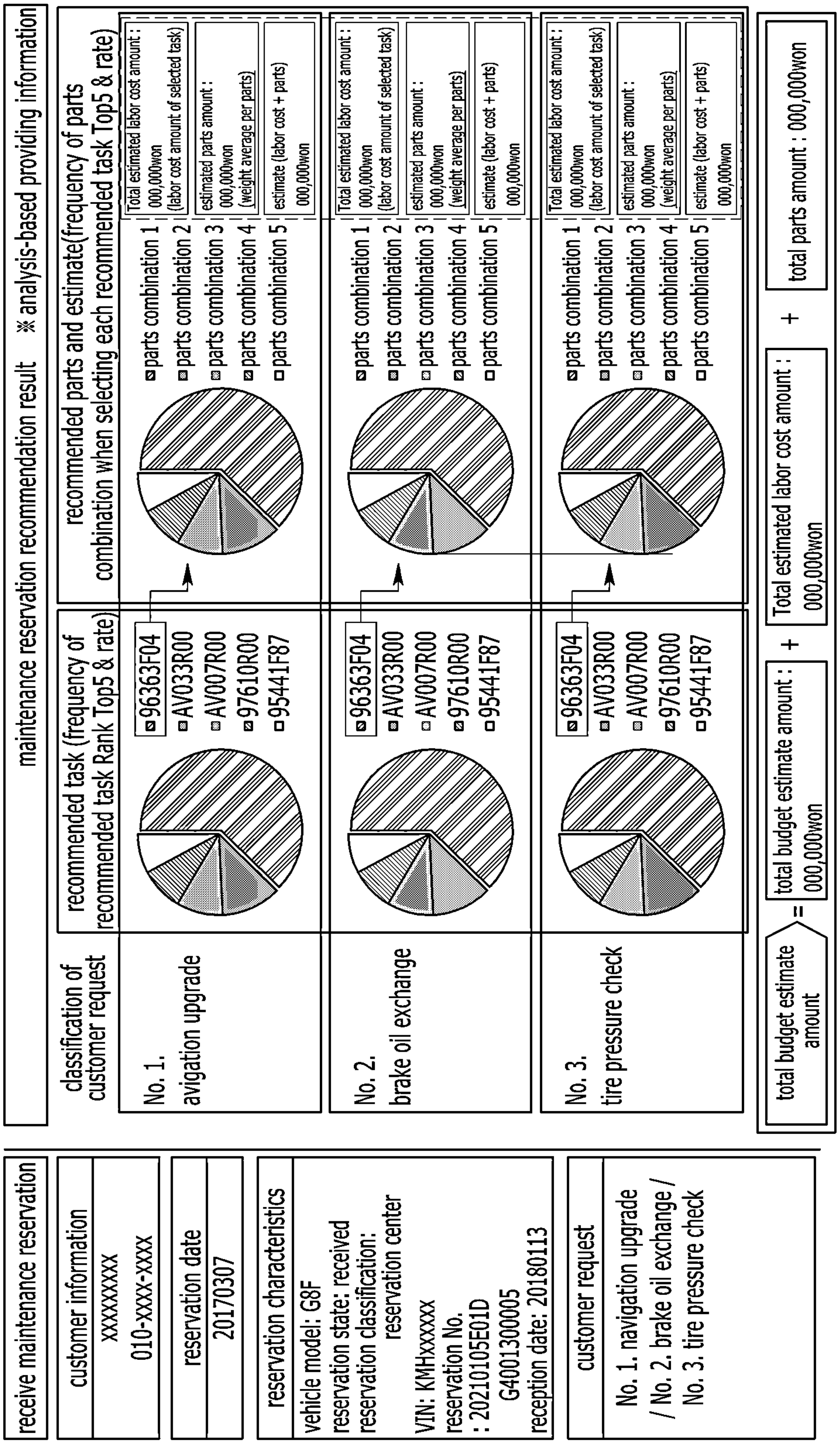
FIG. 7 is a diagram illustrating an implementation example of a recommendation system for a vehicle maintenance reservation according to an exemplary embodiment of the present disclosure.

FIG. 7 is a diagram illustrating an implementation example of a recommendation system for a vehicle maintenance reservation according to an exemplary embodiment of the present disclosure.

Referring to FIG. 7, it may be seen that, after a maintenance reservation was received, customer requests, such as "navigation upgrade," "brake oil change," and "tire air pressure check" were analyzed as matters related to the current state of the vehicle. Multiple recommended tasks may be presented according to each customer request, and multiple recommended parts and estimates may be presented for each task. of course, FIG. 7 shows only an exemplary screen configuration and does not limit the scope of the present disclosure.

Figure 8:
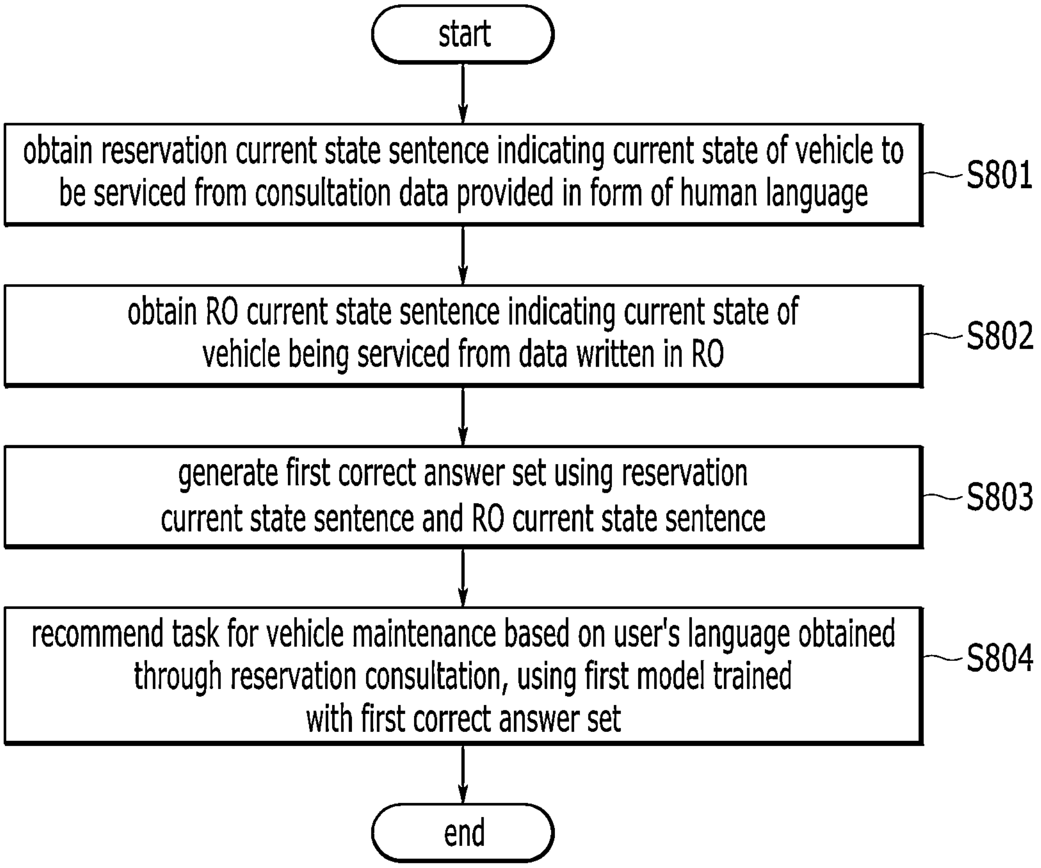
FIG. 8 is a flowchart illustrating a recommendation method for a vehicle maintenance reservation according to an exemplary embodiment of the present disclosure.

FIG. 8 is a flowchart illustrating a recommendation method for a vehicle maintenance reservation according to an exemplary embodiment of the present disclosure.

Referring to FIG. 8, the recommendation method for a vehicle maintenance reservation according to an exemplary embodiment of the present disclosure includes an operation (S801) of obtaining a reservation current state sentence indicating a current state of a vehicle to be serviced from consultation data provided in a form of a human language, an operation (S802) of obtaining a repair order current state sentence indicating the current state of the vehicle being serviced from data written in a repair order, an operation (S803) of generating a first correct answer set using the reservation current state sentence and the repair order current state sentence, and an operation (S804) of recommending a task for vehicle maintenance based on a user's language obtained through reservation consultation, using a first model trained with the first correct answer set. For more detailed information on the method, the description of the exemplary embodiments described in the present specification may be referred to or applied mainly with reference to FIGS. 1 to 7, so redundant description will be omitted here.

Figure 9:
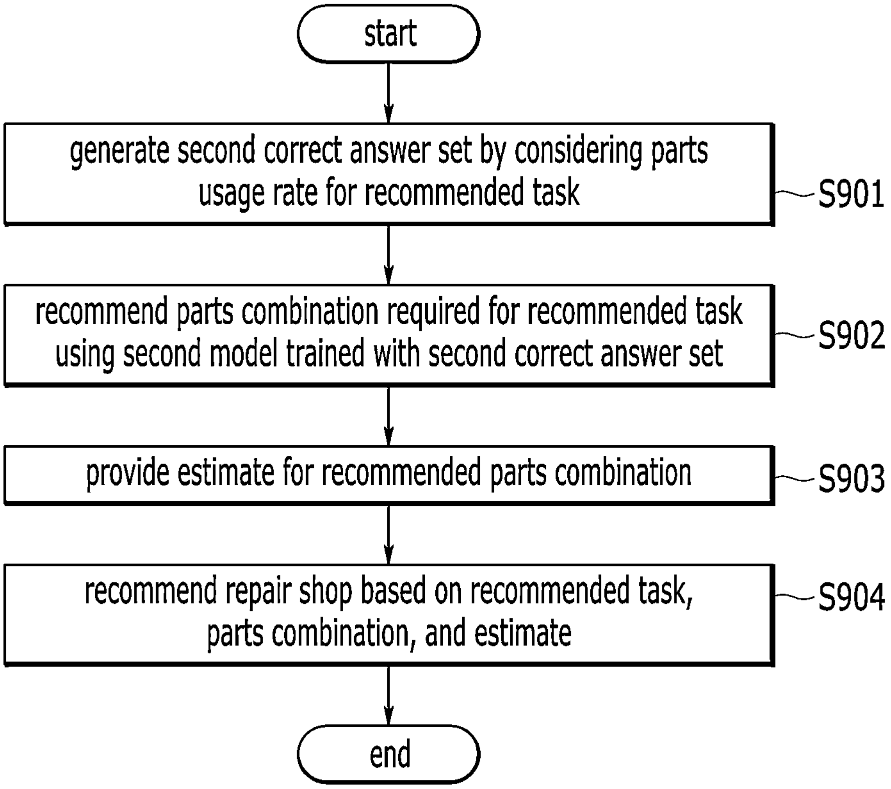
FIG. 9 is a flowchart illustrating a recommendation method for a vehicle maintenance reservation according to an exemplary embodiment of the present disclosure.

FIG. 9 is a flowchart illustrating a recommendation method for a vehicle maintenance reservation according to an exemplary embodiment of the present disclosure.

Referring to FIG. 9, the recommendation method for a vehicle maintenance reservation according to various exemplary embodiments of the present disclosure may include an operation (S901) of generating a second correct answer set by considering a parts usage rate for the recommended task, an operation (S902) of recommending a parts combination required for the recommended task using a second model trained with the second correct answer set, an operation (S903) of providing an estimate for the recommended parts combination, and an operation (S904) of recommending a repair shop based on the recommended task, the parts combination, and the estimate. For more detailed information on the method, the description of the exemplary embodiments described in the present specification may be referred to or applied mainly with reference to FIGS. 1 to 7, so redundant description will be omitted here.

Figure 10:
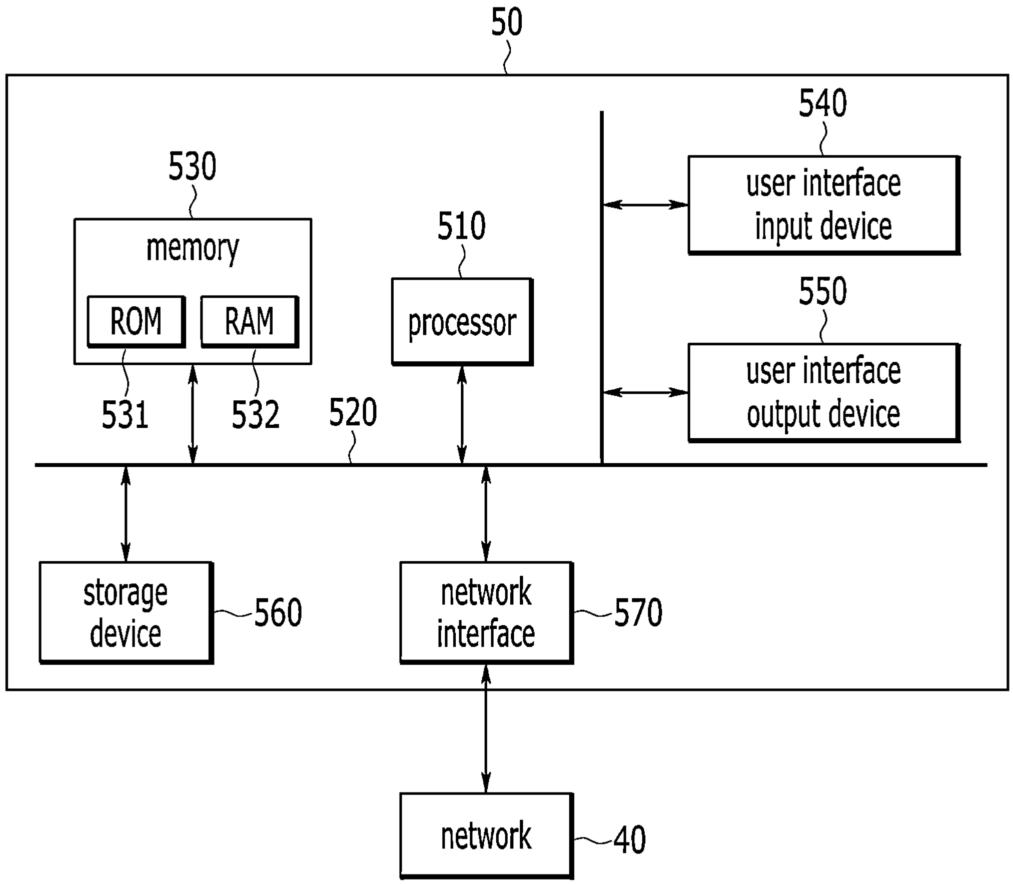
FIG. 10 is a diagram illustrating a computing device according to an exemplary embodiment of the present disclosure.

FIG. 10 is a diagram illustrating a computing device according to an exemplary embodiment of the present disclosure.

Referring to FIG. 10, a recommendation system and method for a vehicle maintenance reservation according to various exemplary embodiments of the present disclosure may be implemented using a computing device 50.

The computing device 50 may include at least one of a processor 510, a memory 530, a user interface input device 540, a user interface output device 550, and a storage device 560 that communicate over a bus 520. The computing device 50 may also include a network interface 570 that is electrically connected to a network 40. The network interface 570 may transmit or receive signals to or from other entities through the network 40.

The processor 510 may be implemented as various types, such as a micro controller unit (MCU), an application processor (AP), a central processing unit (CPU), a graphic processing unit (GPU), a neural processing unit (NPU), a quantum processing unit (QPU), etc and may be a semiconductor device that executes instructions stored in the memory 530 or the storage device 560. The processor 510 may be configured to implement the functions and methods described above with respect to FIG. 1, FIG. 2, FIG. 3, FIG. 4, FIG. 5, FIG. 6, FIG. 7, FIG. 8 and FIG. 9.

The memory 530 and the storage device 560 may include various types of volatile or non-volatile storage mediums. For example, the memory may include read-only memory (ROM) 531 and random access memory (RAM) 532. In an exemplary embodiment of the present disclosure, the memory 530 may be located inside or outside the processor 510, and the memory 530 may be connected to the processor 510 through various known means.

In various exemplary embodiments of the present disclosure, at least some components or functions of the recommendation system and method for a vehicle maintenance reservation according to the exemplary embodiments of the present disclosure may be implemented as a program or software running on the computing device 50, and the program or software may be stored in a computer-readable medium. The computer-readable medium according to various exemplary embodiments of the present disclosure may record a program for executing the operations included in the recommendation system and method for a vehicle maintenance reservation according to the exemplary embodiments on a computer including the processor 510 that executes a program or command stored in the memory 530 or the storage device 560.

In some exemplary embodiments of the present disclosure, at least some components or functions of the recommendation system and method for a vehicle maintenance reservation according to exemplary embodiments of the present disclosure may be implemented using hardware or circuits of the computing device 50 or may be implemented using separate hardware or circuits that may be electrically connected to the computing device 50.

According to various exemplary embodiments of the present disclosure, it is possible to recognize a current state of a vehicle problem from human language in a form of consultation contents or document and recommend tasks and parts required for maintenance, as well as providing an estimate or recommending a vehicle repair shop based on the recommended tasks and parts, providing convenient and abundant maintenance reservation services to users.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, multiple operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operably may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A recommendation system for a vehicle maintenance reservation, the recommendation system comprising:

a processor; and a memory storing instructions that, when executed by the processor, cause processor to:

obtain a reservation current state sentence indicating a current state of a vehicle to be serviced from consultation data provided in a form of a human language;

obtain a repair order current state sentence indicating the current state of the vehicle being serviced from data written in a repair order;

generate a first correct answer set using the reservation current state sentence and the repair order current state sentence; and recommend a task for vehicle maintenance based on a user's language obtained through reservation consultation, using a first model trained with the first correct answer set, wherein the repair order current state sentence is obtained using a prediction model, which is trained using tagged values of integers indicating the current state, a cause and an action.

2. The recommendation system of claim 1, wherein the instructions further cause the processor to:

generate a 1:N mapping for the reservation current state sentence and the repair order current state sentence, wherein the N is an integer of 1 or more, determine a similarity between the reservation current state sentence and the repair order current state sentence, and determine a vehicle model, a task name, and a task code for maintenance work, with respect to a mapping relationship between the reservation current state sentence and the repair order current state sentence whose similarity is more than or equal to a predetermined threshold to generate the first correct answer set.

3. The recommendation system of claim 2, wherein the instructions further cause the processor to: determine a similarity including a cosine similarity and a rank for the reservation current state sentence and the repair order current state sentence.

4. The recommendation system of claim 2, wherein the instructions further cause the processor to: generate the first correct answer set including both a correct answer set generated when the N is 1 and a correct answer set generated when the N is more than 2.

5. The recommendation system of claim 4, wherein the instructions further cause the processor to: generate the first correct answer set further including a correct answer set generated only from the repair order current state sentence.

6. The recommendation system of claim 1, wherein the instructions further cause the processor to: recommend a plurality of tasks for the vehicle maintenance, and provides information on a usage rate for each of the recommended tasks.

7. The recommendation system of claim 1, wherein the instructions further cause the processor to:

generate a second correct answer set by considering a parts usage rate for the recommended task; and recommend a parts combination required for the recommended task using a second model trained with the second correct answer set.

8. The recommendation system of claim 7, wherein the instructions further cause the processor to: generate the second correct answer set including a correct answer set including a parts combination in which the parts usage rate satisfies a predetermined first condition and a correct answer set including a parts combination in which the parts usage rate does not satisfy the first condition but satisfies a predetermined second condition.

9. The recommendation system of claim 8, wherein the instructions further cause the processor to: generate the second correct answer set further including a newly generated correct answer set according to probability of occurrence of a new parts combination.

10. The recommendation system of claim 7, wherein the instructions further cause the processor to:

provide an estimate for the recommended parts combination; and recommend a repair shop based on the recommended task, the parts combination, and the estimate.

11. A recommendation method for vehicle maintenance reservation, the recommendation method comprising:

obtaining a reservation current state sentence indicating a current state of a vehicle to be serviced from consultation data provided in a form of a human language;

obtaining a repair order current state sentence indicating the current state of the vehicle being serviced from data written in a repair order;

generating a first correct answer set using the reservation current state sentence and the repair order current state sentence; and recommending a task for vehicle maintenance based on a user's language obtained through reservation consultation, using a first model trained with the first correct answer set, wherein the repair order current state sentence is obtained using a prediction model, which is trained using tagged values of integers indicating the current state, a cause and an action.

12. The recommendation method of claim 11, wherein the generating of the first correct answers set includes:

generating a 1:N mapping for the reservation current state sentence and the repair order current state sentence, wherein the N is an integer of 1 or more;

determining a similarity between the reservation current state sentence and the repair order current state sentence; and determining a vehicle model, a task name, and a task code for maintenance work, with respect to a mapping relationship between the reservation current state sentence and the repair order current state sentence whose similarity is more than or equal to a predetermined threshold to generate the first correct answer set.

13. The recommendation method of claim 12, wherein the generating of the first correct answer set includes:

determining a similarity including a cosine similarity and a rank for the reservation current state sentence and the repair order current state sentence.

14. The recommendation method of claim 12, wherein the generating of the first correct answer set includes:

generating the first correct answer set including both a correct answer set generated when the N is 1 and a correct answer set generated when the N is more than 2.

15. The recommendation method of claim 14, wherein the generating of the first correct answer set includes:

generating the first correct answer set further including a correct answer set generated only from the repair order current state sentence.

16. The recommendation method of claim 11, wherein the recommending of the task for vehicle maintenance includes:

recommending a plurality of tasks for the vehicle maintenance; and providing information on a usage rate for each of the recommended tasks.

17. The recommendation method of claim 11, further including:

generating a second correct answer set by considering a parts usage rate for the recommended task; and recommending a parts combination required for the recommended task using a second model trained with the second correct answer set.

18. The recommendation method of claim 17, wherein the generating of the second correct answer set includes:

generating the second correct answer set including a correct answer set including a parts combination in which the parts usage rate satisfies a predetermined first condition and a correct answer set including a parts combination in which the parts usage rate does not satisfy the first condition but satisfies a predetermined second condition.

19. The recommendation method of claim 18, wherein the generating of the second correct answer set includes:

generating the second correct answer set further including a newly generated correct answer set according to probability of occurrence of a new parts combination.

20. The recommendation method of claim 17, further including:

providing an estimate for the recommended parts combination; and recommending a repair shop based on the recommended task, the parts combination, and the estimate.

* * * * *